United States Patent
Campanaro et al.

(10) Patent No.: US 11,164,401 B2
(45) Date of Patent: Nov. 2, 2021

(54) FLUID SYSTEM FOR A VEHICLE AND A DIAGNOSTIC METHOD FOR THE SYSTEM

(71) Applicant: Ford Global Technologies, LLC, Dearborn, MI (US)

(72) Inventors: Justin Carmen Campanaro, Detroit, MI (US); Nathaniel Patrick O'Brien, Warren, MI (US); Jonathan Andrew Butcher, Farmington, MI (US); Brian Szwejkowski, Canton, MI (US); Carol Louise Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 16/360,388

(22) Filed: Mar. 21, 2019

(65) Prior Publication Data

US 2020/0302709 A1  Sep. 24, 2020

(51) Int. Cl.
*G07C 5/08* (2006.01)
*F16H 57/04* (2010.01)

(52) U.S. Cl.
CPC ....... *G07C 5/0808* (2013.01); *F16H 57/0476* (2013.01); *G07C 5/0841* (2013.01); *B60Y 2200/92* (2013.01)

(58) Field of Classification Search
CPC . G07C 5/0808; G07C 5/0841; F16H 57/0476; F16H 57/0482; F16H 57/0447; B60Y 2200/92; Y02T 10/62; B60K 6/445; B60W 20/50; B60W 50/0205; B60W 50/14; B60W 2050/143
See application file for complete search history.

(56) References Cited

U.S. PATENT DOCUMENTS

| | | | |
|---|---|---|---|
| 5,708,412 A | 1/1998 | Proulx | |
| 9,520,006 B1* | 12/2016 | Sankovsky | G06Q 10/20 |
| 9,790,842 B2 | 10/2017 | Dudar et al. | |
| 2003/0216889 A1* | 11/2003 | Marko | G07C 5/008 |
| | | | 702/182 |
| 2013/0103284 A1 | 4/2013 | Gordon | |
| 2016/0186648 A1* | 6/2016 | Rollinger | F01P 11/04 |
| | | | 123/41.15 |
| 2017/0335751 A1 | 11/2017 | Newman | |

* cited by examiner

*Primary Examiner* — Richard M Camby
(74) *Attorney, Agent, or Firm* — Brooks Kushman P.C.; David Kelley (57) ABSTRACT

A vehicle system includes a vehicle component with a component temperature sensor, and a fluid circuit in fluid communication with the component and with a fluid temperature sensor. A controller is in communication with the component sensor and the fluid sensor. The controller is configured to, in response to a temperature difference between the component sensor and the fluid sensor being greater than a predetermined threshold value, output a flag or a diagnostic code indicative of a fluid level in the fluid circuit. A vehicle diagnostic method and a vehicle are also provided.

20 Claims, 5 Drawing Sheets

FLUID SYSTEM FOR A VEHICLE AND A DIAGNOSTIC METHOD FOR THE SYSTEM

TECHNICAL FIELD

Various embodiments relate to a vehicle fluid system and a diagnostic method for the vehicle fluid system.

BACKGROUND

As a vehicle operates, fluid is circulated in a fluid system to lubricate and/or cool a vehicle component. The fluid system conventionally has a fluid level sensor to determine the level of the fluid in the system and provide an alert to a vehicle operator when the fluid level is low.

SUMMARY

According to an embodiment, a vehicle is provided with an electric machine positioned within a housing having a sump. A component temperature sensor is connected to the electric machine to measure a temperature of the electric machine. A fluid system is in fluid communication with the housing and contains a lubricant. The fluid system receives fluid from the sump and delivers fluid to the electric machine. The fluid system has a fluid temperature sensor to measure a temperature of the lubricant. A controller is in communication with the component temperature sensor and the fluid temperature sensor. The controller is configured to, in response to a temperature difference between the component temperature sensor and the fluid temperature sensor being greater than a predetermined threshold value, output a diagnostic code indicative of the lubricant in the fluid system being less than a predetermined fluid level.

According to another embodiment, a vehicle system is provided with a vehicle component with a component temperature sensor. A fluid circuit is in fluid communication with the component, and has a fluid temperature sensor. A controller is in communication with the component sensor and the fluid sensor. The controller is configured to, in response to a temperature difference between the component sensor and the fluid sensor being greater than a predetermined threshold value, output a flag indicative of a fluid level in the fluid circuit.

According to yet another embodiment, a diagnostic method for a vehicle fluid system is provided. A signal indicative of a vehicle component temperature is received. A signal indicative of a fluid system temperature is received from a fluid system in fluid communication with a vehicle component. A diagnostic code is output, the diagnostic code is indicative of a fluid level in response to a temperature difference between the vehicle component temperature and the fluid system temperature being greater than a predetermined threshold value.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
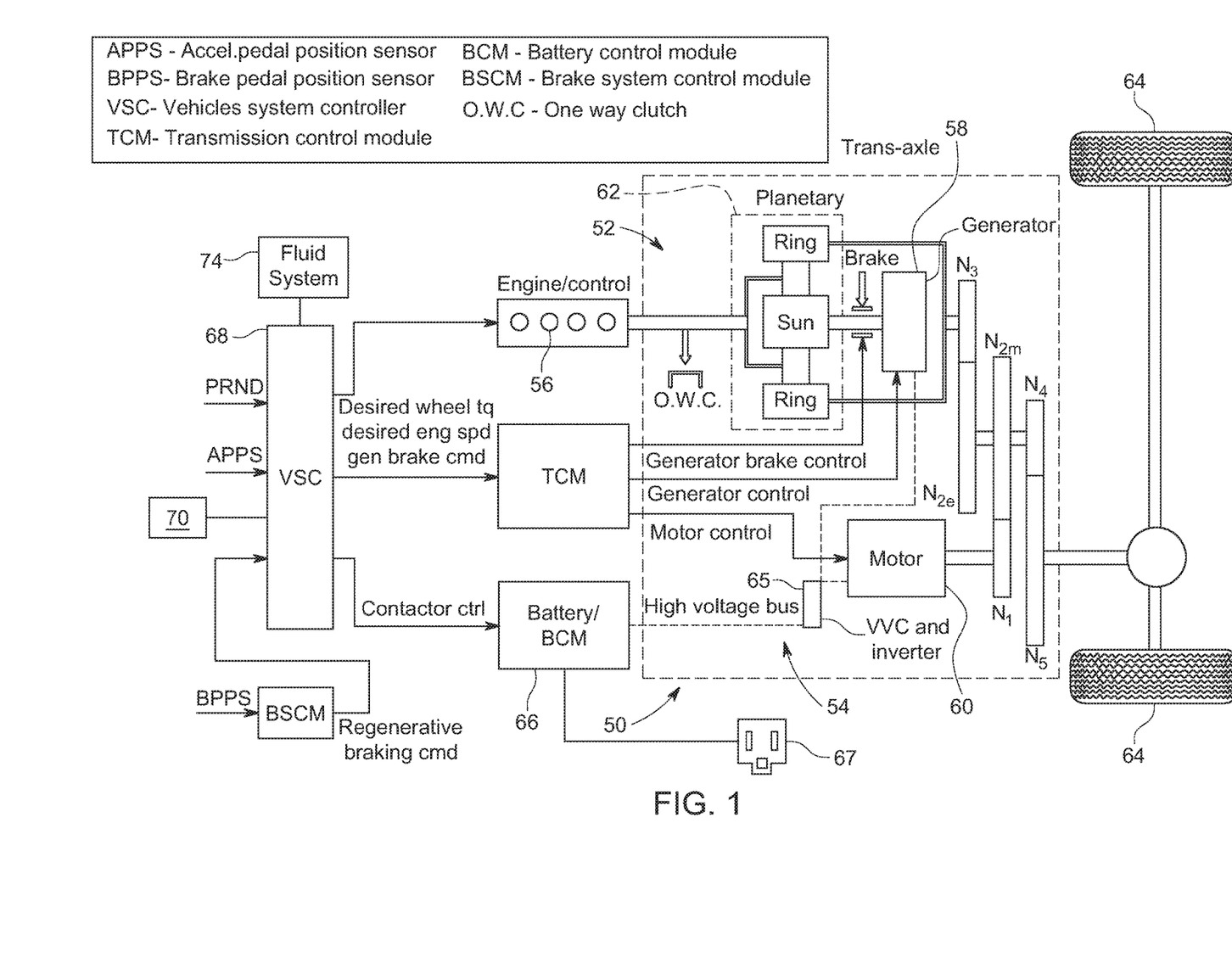
FIG. 1 is a schematic view of a vehicle according to an embodiment and capable of implementing various embodiments of the present disclosure.

FIG. 1 illustrates a schematic view of a vehicle 50 according to an embodiment, and capable of implementing various embodiments according to the present disclosure. The vehicle 50 illustrated is shown as a hybrid vehicle, and is a parallel or power split hybrid electric vehicle. In other examples, various embodiments of the present disclosure may be implemented with other vehicle system architectures, including a series hybrid electric vehicle, a battery electric vehicle, start-stop vehicle, a micro-hybrid vehicle, a conventional vehicle with a spark or compression ignition internal combustion engine, or the like. The vehicle may be provided as a plug-in electric vehicle such that the traction battery may be charged using power from an external power source, e.g. the electric grid, via a charging plug as shown, or alternatively, may be provided without a charging plug.

One example of a power split PHEV 50 capable of implementing the present disclosure is shown in FIG. 1. FIG. 1 illustrates the power split hybrid electric vehicle 50 powertrain configuration and control system. In this powertrain configuration, there are two power sources 52, 54 that are connected to the driveline. The first power source 52 is a combination of engine and generator subsystems using a planetary gear set to connect to each other. The second power source 54 is an electric drive system (motor, generator, and battery subsystems). The battery subsystem is an energy storage system for the generator and the motor and includes a traction battery.

During operation of the vehicle 50 using the second power source 54, the electric motor 60 draws power from the battery 66 and provides propulsion independently from the engine 56 to the vehicle 50 for forward and reverse motions. An inverter 65 may be positioned between the battery 66 and the electric machine 60 and generator 58. The inverter 65 may include a variable voltage converter as well. This operating mode is called "electric drive". In addition, the generator 58 can draw power from the battery 66 and drive against a one-way clutch coupling on the engine output shaft to propel the vehicle forward. The generator 58 can propel the vehicle forward alone when necessary. The two power sources 52, 54 are integrated and controlled to meet the user's demand without exceeding the system's limits (such as battery limits) while optimizing the total powertrain system efficiency and performance.

Figure 2:
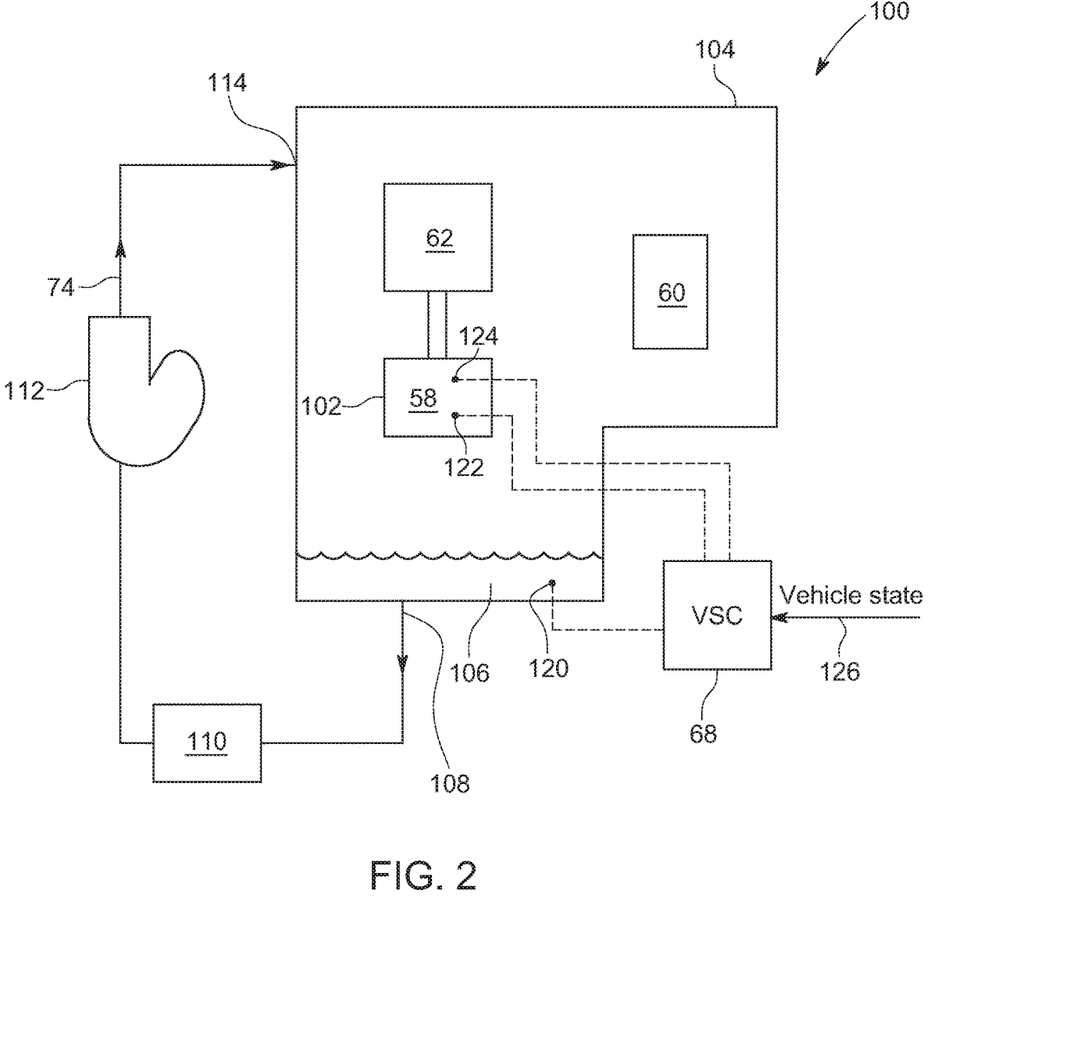
FIG. 2 is a schematic view of a vehicle system and fluid system according to an embodiment, and for use with the vehicle of FIG. 1.

As shown in FIG. 2, there is a hierarchical vehicle system controller (VSC) 68 that controls the power split powertrain system. Under normal powertrain conditions (no subsystems/components faulted), the VSC 68 interprets the user's demands (e.g. PRND and acceleration or deceleration demand), and then determines the wheel torque command based on the user demand and powertrain limits. In addition, the VSC 68 determines when and how much torque each power source needs to provide in order to meet the user's torque demand and achieve the operating point (torque and speed) of the engine.

The VSC 68, which includes an electronic control unit (ECU), is connected to or integrated with a human-machine interface (HMI) 70, or user interface. The user interface 70 may include a user input and a display. The user input may be touch screen and/or a series of tactile buttons. The display may be a screen and/or gauges for displaying information to the user. The user interface may include warning lights, such as a fluid level light providing an indication to the user or operator that a fluid level in the system may be below a predetermined fluid level, e.g. a "low" fluid level. The VSC may set a diagnostic code or flag that is indicative of a fluid level in the system that is below a predetermined fluid level, e.g. a "low" fluid level. In response to the diagnostic code or flag being set, the VSC may activate an indicator light on the user interface, and/or provide the diagnostic code or flag to a user interface such as a multi-pin diagnostic connector or wireless diagnostic connector for access by a service technician. Furthermore and in response to the diagnostic code being set, the VSC 68 may cause the vehicle to enter a limited mode of operation, such as a service mode.

The control system for the vehicle 50 may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The battery 66 may be recharged or partially recharged using a charging adapter 67 connected to a charging station powered by an external power source, such as the electrical grid, a solar panel, and the like. In one embodiment, the charging adapter 67 contains an inverter and/or a transformer on-board the vehicle.

The VSC 68 may receive signals or inputs from various sources to control the vehicle. These inputs include inputs from various sensors on the vehicle and its components, including those associated with a vehicle state such as battery state, fuel level, engine temperature, lubricant temperature, coolant temperature, vehicle speed, APPS sensor position indicating a tip in request, component torque from an engine or electric machine torque sensor, component speed from an engine or electric machine speed sensor, and the like. Route and map information may also be provided to the VSC 68 from a navigation system, which may be incorporated into the user interface 70.

The VSC 68 may also be in communication with a fluid system 74 for the vehicle and/or one or more of its components. In one example, the fluid system 74 or fluid circuit is provided as a coolant circuit containing a coolant fluid for use in controlling a temperature of one or more of the vehicle components, such as the engine, battery, or electric machines. In another example, the fluid system 74 or fluid circuit is provided as a lubricating circuit containing a lubricant fluid for use in lubricating moving parts of one or more of the vehicle components, such as the engine, transmission, or electric machines. A lubricating circuit may additionally provide cooling or temperature control of the components. The fluid system 74 contains one or more sensors to provide input to the VSC 68, such as a fluid temperature sensor, pump speed sensor, and the like; and the VSC 68 may control operation of the fluid system.

FIG. 2 illustrates a vehicle system 100 having a component and an associated fluid system according to an embodiment, and configured to implement various embodiments according to the present disclosure. In one example, the component may be the electric machine 58, and the fluid system may be the fluid system 74 of FIG. 1. In other examples, the component may be the electric machine 60, a gear member in the transmission or planetary gearset, an internal combustion engine, a battery, or the like. Reference numbers for elements that are the same as or similar to those described above with respect to FIG. 1 are given the same reference number for simplicity.

According to the example shown, the vehicle system 100 has a vehicle component 102, such as a electric machine or generator 58. The vehicle system may additionally contain components such as a planetary gearset 62, and another electric machine 60. The vehicle component 102 is contained within a housing 104. The housing may provide a wet environment surrounding at least a portion of the component 102, or alternatively the component 102 may define internal fluid passages in communication with the fluid system 74.

The fluid system 74 may be provided as a fluid circuit. The fluid system 74 draws fluid from a reservoir or sump 106. The reservoir or sump 106 may be defined by the housing 104 and defines a fluid outlet 108. Fluid may flow through a filter element 110, and then through a pump 112. The pump may be mechanically driven and/or electrically driven. The pump 112 pressurizes the fluid and delivers it to a fluid inlet 114 for the housing 104. The housing 104 may contain various fluid passages and ports to deliver pressurized fluid, such as a lubricant, to various rotating components within the housing 104. The fluid in the housing 104 then drains back to the sump 106.

As shown in FIG. 2, the vehicle system 100 does not have a fluid level sensor, and the present disclosure provides for a method of determining when the fluid level is low, or less than a predetermined fluid level. In other examples, the vehicle system may be provided with a fluid level sensor, e.g. at the sump, and the present disclosure provides for a method of determining when the fluid level is low or less than a predetermined value in order to confirm that the fluid level sensor is operating correctly, or in the event that the fluid level sensor stops operating.

The controller 68 is configured to implement various methods according to the present disclosure for the vehicle system. The controller 68 is in communication with a fluid temperature sensor 120 that is configured to measure the temperature of the fluid and provide a signal to the controller 68. The fluid temperature sensor 120 may be positioned in the sump 106. In other examples, the fluid temperature sensor may be provided at another location within the fluid system 74.

The controller 68 is also in communication with a vehicle component temperature sensor 122. The vehicle component temperature sensor 122 is configured to measure the temperature of the vehicle component and provide a signal to the controller 68. The component temperature sensor 122 is connected to the vehicle component 102. In the example shown, the component temperature sensor 122 is connected to the stator of the electric machine 58, and may be provided as a bearing temperature sensor or thermistor, or a coil temperature.

The controller 68 also receives signals from sensors that are indicative of a vehicle state. In one example, and as shown, the controller 68 receives a signal from a sensor 124 associated with a state of the vehicle component. The sensor 124 may provide a signal indicative of a torque of the electric machine 58 to the controller 68. The sensor may alternatively provide a signal indicative of a speed of the electric machine 58.

For other vehicle components such as those in a battery electric vehicle, the controller 68 may receive a signal indicative of an electric machine coil temperature. The controller 68 may additionally or alternatively receive a signal indicative of another vehicle state using a signal from another sensor 126 on the vehicle or vehicle system, such as a vehicle speed, fluid mass flow, heat transfer rate, APPS position, torque command or request to the vehicle powertrain or a component, and the like.

The controller 68 implements a method, such as method 150 as described below with reference to FIG. 4, to provide a diagnostic for a vehicle system with a vehicle component thermally managed by a liquid fluid in a fluid system. When the component heats up during vehicle operation, the fluid is circulated to remove heat and/or lubricate the component. In various examples when a physical fluid level sensor is not present in the system or is unavailable to measure the level of coolant, the controller uses the method 150 to detect a loss of fluid or a low fluid level by analyzing the temperature and heating characteristics of the component compared to the fluid.

Rotating machinery that produce or transfer power, such as a transmission or electric machine, generates heat and may require cooling and lubrication with operation. For example and with reference to FIGS. 1-2, lubricant such as a transmission fluid is delivered to the housing 104 and drips onto and splashes on electric machine 58. When the controller determines that a fluid level is low, or below a predetermined fluid level, the controller may set a diagnostic code or flag to alert the driver that a service event may be needed. In other embodiments, and as contemplated by the disclosure, the method 150 as described below may be applied to another vehicle or vehicle system using a coolant or lubricant fluid and a component, and provide a diagnostic for a low fluid level.

Figure 3:
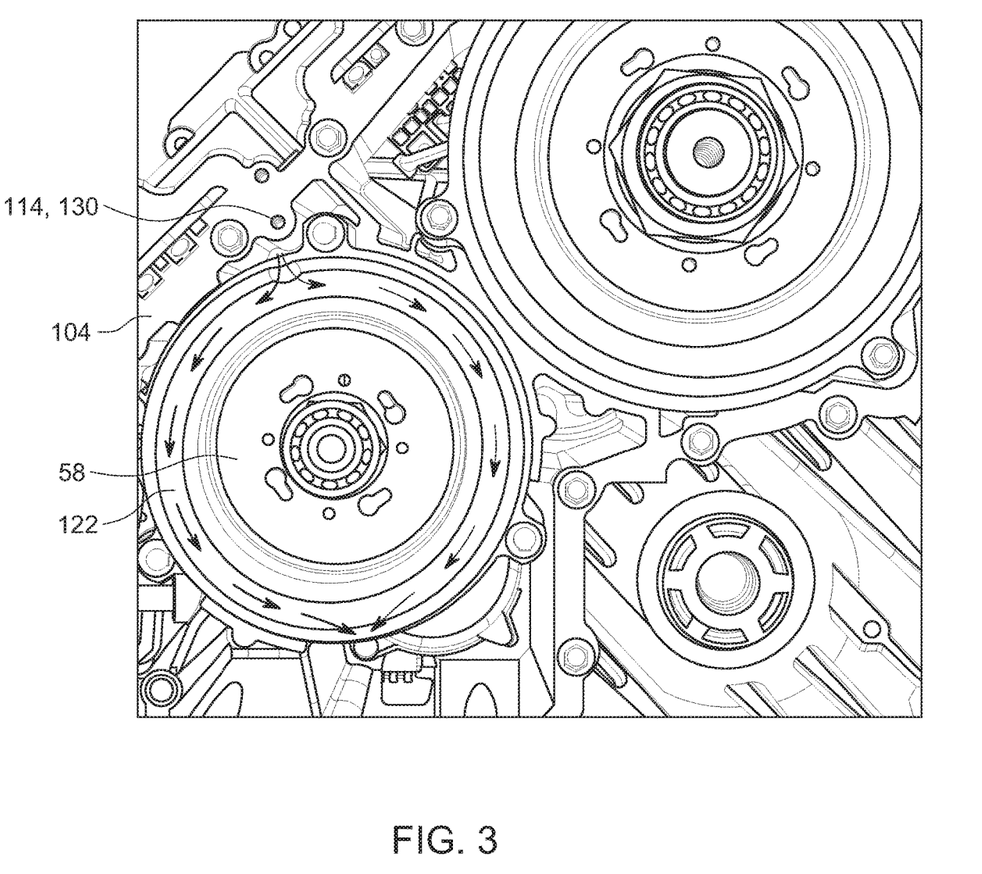
FIG. 3 is a schematic view of a vehicle system and component according to an embodiment, and for use with the vehicle of FIG. 1 and the vehicle system of FIG. 2.

FIG. 3 illustrates a partial schematic view of a housing 104 similar to that described above with reference to FIG. 2. In FIG. 3, the fluid flows through a port 130 in the housing and is directed to the electric machine 58. The fluid may be a lubricant, and drips on top of, splashes on, and surrounds the base of the generator 58. The base of the generator may be positioned adjacent to the sump 106, and may be a component in the housing that is closest to the sump. In further examples, at least a portion of the vehicle component is in contact with or soaked with fluid in the sump 106. The fluid may be unevenly distributed about the electric machine 58, and in the example shown, the lubricant sprayed from the port flows heavier towards the left-hand side of the generator 58; however, the right-hand side also receives fluid. The lubricant flow about the electric machine 58 is shown generally in FIG. 3 using arrows. The generator 58 may additionally throw lubricant as it rotates. The amount of lubricant that the generator 58 throws is related to the speed of the generator 58. The speed of the generator 58 may therefore delay drainage of the fluid into the sump and vary the fluid level in the sump.

Figure 4:
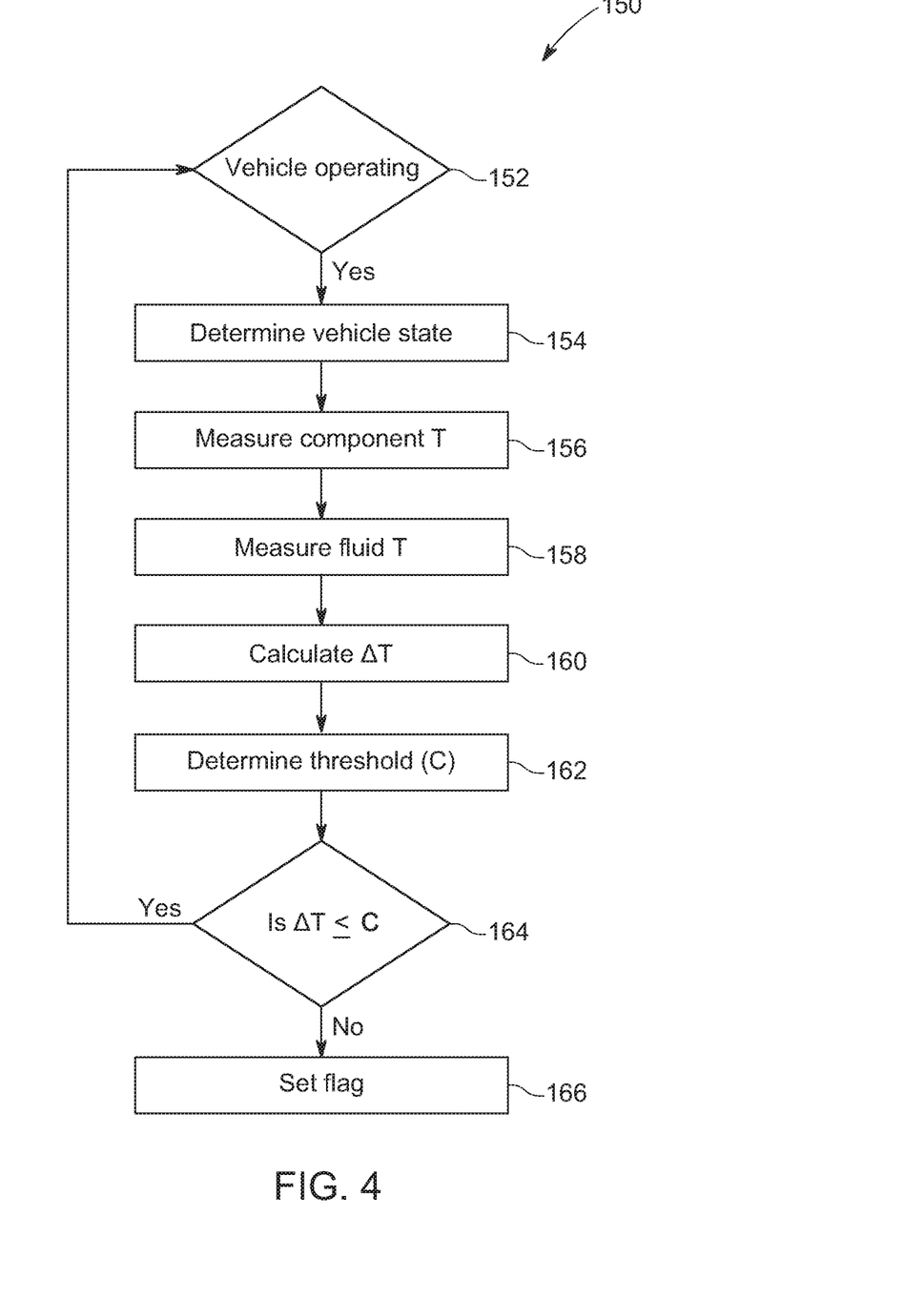
FIG. 4 is a flow chart of a diagnostic method according to an embodiment.

FIG. 4 illustrates a flow chart for a method 150 according to the present disclosure. The method 150 may be implemented by a controller such as controller 68 in FIGS. 1-2. In other examples, various steps may be omitted, added, rearranged into another order, or performed sequentially or simultaneously. Although the method 150 is described with respect to use with a vehicle system as shown in FIG. 2, the method may likewise be applied for use with a vehicle system having another vehicle component and fluid system as described above, and in a vehicle with another architecture as described above with respect to FIG. 1.

Generally, the controller 68 implements the method 150 and outputs a flag or a diagnostic code indicative of the lubricant in the fluid system being less than a predetermined fluid level in response to a temperature difference between the component temperature sensor and the fluid temperature sensor being greater than a predetermined threshold value.

At step 152, the controller 68 determines if the vehicle is operating and if the fluid system is operating. The vehicle operating may be indicated by a "key on" state of the vehicle. The fluid system operating may be indicated by the pump rotating.

At step 154, the controller determines at least one vehicle state. The vehicle state may be a state of the component and/or a state of the vehicle. According to one example, the vehicle state is at least one of a torque value and a speed value for the vehicle. In the present example, the controller receives a signal indicative of torque of the electric machine from a torque sensor associated with the electric machine, and also receives a signal indicative of a speed of the vehicle from a vehicle speed sensor. In other examples, the vehicle state may be associated with an electric machine coil temperature, an electric machine speed, current flow through a component, a vehicle speed, a fluid mass flow, a heat transfer rate, an APPS position, a torque command or request to the vehicle powertrain or a component, and the like. The vehicle state may provide an indication or representation of the vehicle drive cycle or the vehicle driving condition that the vehicle is currently operating in.

In various examples, the controller may calculate the vehicle state using a rolling average of data from at least one signal associated with the vehicle state. The rolling average may reduce noise in the signal. The rolling average may be calibratable for the vehicle, and may be selected between a ten-second average to a five-minute average. In some examples, a thirty-second average or one-minute average may be selected. The rolling average time for the vehicle states may be the same as one another or different from one another. The controller may calculate a first value as a rolling average of the electric machine torque, and calculate a second value as a rolling average of the vehicle speed.

In the present example, the torque of the electric machine 58 is used as a vehicle state because it scales with an electrical current of the electric machine, which is directly related to the amount of heating in the electric machine. The vehicle speed is used as the other vehicle state as it represents driving conditions for the vehicle or a driving cycle, such as low speed city driving or high-speed highway driving. The driving cycle provides an indication of the amount of vehicle torque required for vehicle propulsion, and therefore also relates to the amount of electrical current for the electric machine. The vehicle speed may also correlate to fluid splashing and mixing in the sump and housing, as well as to airflow and natural air-aspiration cooling of the transmission.

At step 156, the controller receives a signal indicative of a vehicle component temperature from a component temperature sensor associated with a vehicle component.

At step 158, the controller receives a signal indicative of a fluid system temperature from a fluid temperature sensor in a fluid system in fluid communication with the vehicle component.

For each of steps 156 and 158, the controller may filter the temperature signals to reduce noise.

At step 160, the controller calculates a temperature difference between the temperature sensed for the vehicle component and the temperature sensed for the fluid. Typically, when a vehicle is operating and after a warm-up period, the component temperature is higher than the fluid temperature. In one example, the temperature difference is calculated as the component temperature minus the fluid temperature.

At step 162, the controller uses a vehicle state to select a predetermined threshold value (C) from a set of predetermined threshold values. The predetermined threshold value may vary with different vehicle states, and the controller may reference a lookup table to determine the threshold associated with the present vehicle state for use in the method 150. The predetermined threshold value represents an expected temperature difference between the component and the fluid under a normal or acceptable fluid level in the fluid system, e.g. a fluid level above the predetermined fluid level.

The predetermined threshold value may be dependent on a vehicle drive cycle(s) or the vehicle driving conditions. The predetermined threshold value may be dependent on the vehicle state, or may be dependent on more than one vehicle state. As the vehicle state(s) changes, the predetermined threshold value selected from the set of predetermined threshold values also changes. A vehicle drive cycle may include drive cycles associated with city driving, highway driving, cold weather, hot weather, high altitude, high grade, mountain driving, rolling hill driving, driving after cold soak, and the like. In one example, the set of drive cycles encompasses all temperature and road conditions that a production vehicle may encounter in the real world, and are therefore related to the vehicle driving conditions.

In one example, and as described below with reference to FIG. 5, the predetermined threshold value may be determined using data collected from fleet vehicles driving in the various driving cycles and conditions to provide statistically significant samples for correlation between driving cycle, or vehicle driving condition, and the expected temperature difference.

According to the present example, the controller may input the first value indicative of an electric machine torque and the second value indicative of a vehicle speed into a lookup table containing the set of predetermined threshold values to select the predetermined threshold value from the set of predetermined threshold values.

At step 164, the controller compares the temperature difference to the predetermined threshold value (C).

If the temperature difference is less than or equal to the predetermined threshold value, the controller proceeds back to step 152.

If the temperature difference is greater than the predetermined threshold value, the controller proceeds to step 166, and sets a flag or diagnostic code. The flag or diagnostic code is indicative of the fluid level in the fluid circuit being less than a predetermined fluid level.

The present disclosure therefore provides for a diagnostic method for a vehicle that detects a loss of coolant in a fluid system with heat transfer between the fluid and a vehicle component, or the fluid level being below a predetermined fluid level. The method uses temperature data and other measured vehicle data to detect a low fluid level or the loss of fluid. For example, a vehicle component and the fluid are each are equipped with their own temperature sensors. A temperature relationship exists between the component and the fluid, regardless of whether or not the fluid's primary purpose is to lubricate or to cool the component. The method may determine a reduction in fluid volume in the system, or a level of the fluid being low, based on temperature differences and changes between the component and the fluid. The method may determine if the temperature difference deviates from a normal or expected temperature difference at that vehicle operating state, and flag an event with deviation as a possible loss of fluid or low fluid event.

For example, if the component ordinarily heats up from heavy usage or load such as a rapid vehicle acceleration or high-speed driving, then an increase in the temperature difference between the component and the fluid may fall within an expected or normal behavior. However, if the component heats up excessively under these conditions, or is heating up unusually during normal usage conditions, then an increase in the temperature difference between the component and the fluid may indicate a possible loss of fluid in the system or a low fluid level.

By using rolling averages of a vehicle state such as an electric machine torque and a vehicle speed to predict a normal distribution of temperature differences between the electric machine and fluid, the method may detect deviations and unexpected generator heating to indicate low fluid levels. The method may provide a code or flag to warn the driver of a possible low fluid condition and indicate the need for a service event.

Figure 5:
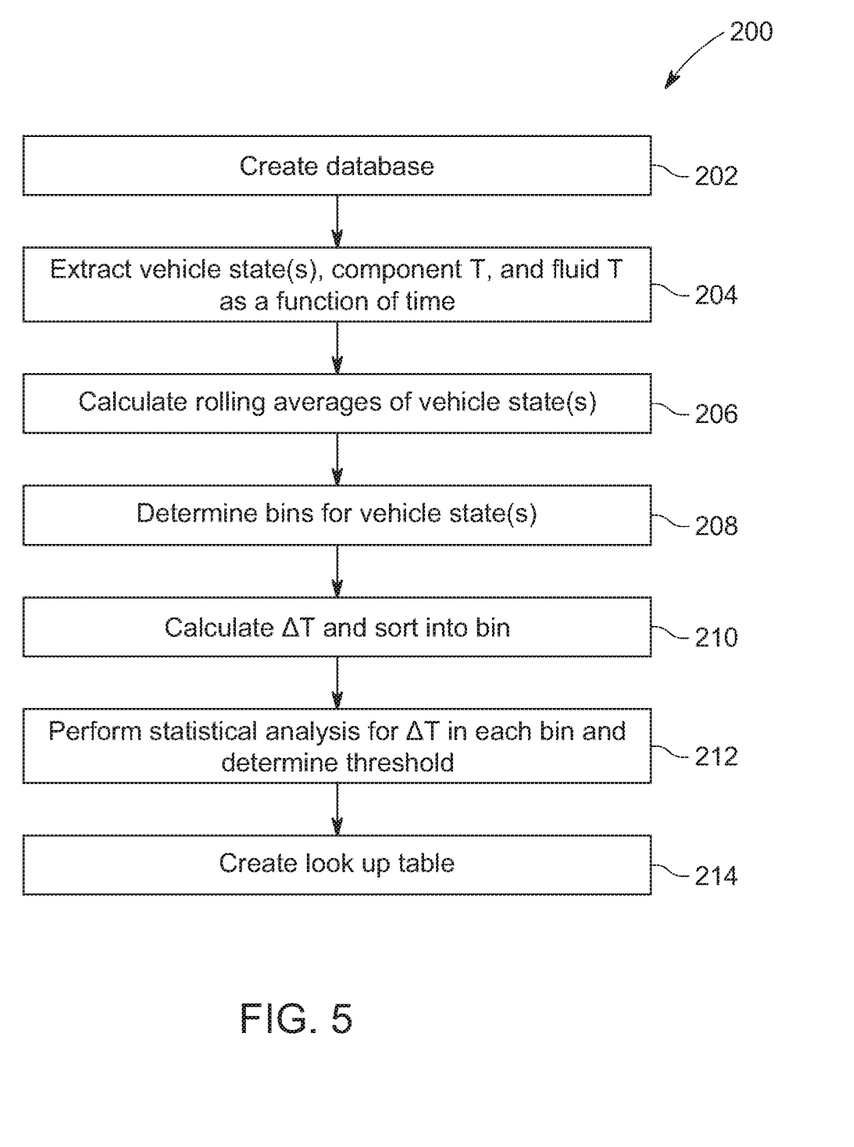
FIG. 5 is a flow chart of a sub-method for use with the diagnostic method of FIG. 4.

FIG. 5 illustrates a flow chart for a method 200 of determining a temperature threshold value for use with the method of FIG. 4 according to an embodiment. The method 200 may be implemented by a controller such as controller 68 in FIGS. 1-2, or may be provided to the controller 68 and stored for example in memory on-board the vehicle. In other examples, various steps may be omitted, added, rearranged into another order, or performed sequentially or simultaneously. Although the method 200 is described with respect to a vehicle system as shown in FIG. 2 and with the method 150, the method 200 may likewise be applied for use with a vehicle system having another vehicle component and fluid system as described above, and in a vehicle with another architecture as described above with respect to FIG. 1.

At step 162 in FIG. 4 above, the method 150 references one or more lookup tables to determine the appropriate predetermined threshold value from a set of predetermined threshold values. The lookup table is created as described in FIG. 5 with reference to method 200 by learning an expected temperature difference between the component and the fluid for the various driving conditions, drive cycles, and vehicle states. In one example, a single lookup table are created and referenced. In another example, two lookup tables are created and referenced.

At step 202, data files are input into a database. The data files are representative of real-world driving of vehicles with the same architecture. The data files may be collected from vehicle testing, fleet vehicle use, and the like, and may be representative of thousands of hours of vehicle operation across the range of vehicle drive cycles. The data covers a range of driving conditions expected for a vehicle, from hot trips in Arizona to cold trips in Canada to mountain driving in Colorado, various terrain, highway and city driving, and the like. Alternatively, the method 200 may reference an existing database, for example, one used by a vehicle calibration engineer.

At step 204, the data files are scanned, and specified vehicle states, the component temperature, and the fluid temperature are extracted as a function of time from each cycle. For example, at each time instant, a speed, a torque, a component temperature, and a fluid temperature may be extracted. In one example, a pair of vehicle states are extracted. In another example, more than two vehicle states are extracted, and may be examined later in the method 200 to determine which vehicle states are most statistically significant for use in the final lookup table. In the present example, and with reference to FIGS. 1-4, the electric machine 58 torque and the vehicle speed are the vehicle states that are extracted from the data files.

At step 206, rolling averages are calculated for each of the extracted vehicle states. The rolling average may be calibratable for the vehicle, and may be selected from a ten-second average to a five-minute average. In some examples, a thirty-second average or one-minute average may be selected. The rolling average time for the vehicle states may be the same as one another or different from one another. The rolling averages are used to create a vehicle state pair, for example, as the rolling average of the electric machine torque and the vehicle speed. Each vehicle drive cycle therefore provides a number of vehicle state pairs, with each vehicle state pair associated with a different time during the vehicle drive cycle, and having associated component and fluid temperatures.

At step 208, bins are defined and created for the vehicle state pairs from the data file data. Each bin is associated with a unique pair of vehicle states, or unique combination of electric machine torque and vehicle speed. These bins form the framework for the lookup table or map.

At step 210, the temperature difference between the component temperature and the fluid temperature is determined for each vehicle state pair and associated time is calculated. Prior to determining the temperature difference, each of the component and fluid temperatures may be filtered using a low pass filter. The temperature difference for each vehicle state pair is then input into the bin associated with the vehicle state pair. As the same unique combination of vehicle states occurs many times within the database of drive files, each bin contains multiple temperature differences from different times and drive cycles.

At step 212, the set of temperature differences within each bin is statistically analyzed. In one example, the mean or average absolute deviation and the standard deviation of the temperature differences within each bin is computed.

At step 214, the lookup table(s) are created.

In one example, the lookup table uses a vehicle state pair as an input to reference an associated predetermined threshold value. The mean and standard deviations, for each speed-torque pair and bin, are used to determine a predetermined threshold value representative of an acceptable or "normal" temperature difference for that driving condition and for use in the lookup table. In one example, the predetermined threshold value is set as being one standard deviation above the mean of the temperature differences within the bin. In one example, the predetermined threshold value is set as being one mean deviation above the mean of the temperature differences within the bin. In further examples, more than one deviation may be used to determine the predetermined threshold value. In other examples, the predetermined threshold value may be set based on another statistical analysis. The lookup table therefore contains a set of predetermined threshold values that are dependent on the vehicle state pair, which is representative of a vehicle drive cycle.

In another example, a pair of lookup tables are created. One lookup table contains a first value from the statistical analysis, such as the mean temperature difference within each bin and for each vehicle state pair. Another lookup table contains a second value from the statistical analysis, such as a standard deviation of the temperature difference within each bin and for each vehicle state pair. By using two or more lookup tables, additional flexibility is provided at step 162 above to calibrate components that are more or less sensitive than others, and the controller uses this pair of lookup tables to create and modify a third lookup table using in the information from the pair of lookup tables while the vehicle is operating, with the third lookup table containing a set of predetermined threshold values as a function of vehicle state pairs.

In other examples, steps 204-214 may be performed by another machine learning algorithm to provide a lookup table or the like. For example, a machine learning algorithm such as a support vector machine, a neural network, or another machine learning and classification technique may be used to determine the lookup table and threshold values from the vehicle states and temperatures.

The method 200 may therefore compile a lookup table using temperature difference data compiled from prior vehicle drive cycles and dependent on the vehicle state. Each predetermined threshold value may be set using the temperature difference data from the associated vehicle drive cycle, or vehicle state pair, and at least one of an average deviation and standard deviation for temperature difference data for the associated vehicle drive cycle.

The method 200 is used to learn the standard temperature differences, or temperature differences with an acceptable fluid level above a predetermined threshold level, between the component and the fluid, under a variety of use-cases and driving conditions, by analyzing large data sets of driving information from a fleet of vehicles via a controller. In this case, inputs to the detection algorithm include, but are not limited to, filtered component and fluid temperatures as well as rolling averages of vehicle states such as torque and speed. Other input variables or inputs of interest for vehicle state include machine speed, vehicle speed, coolant mass flow, or heat transfer rates.

Various embodiments accord to the present disclosure have associated, non-limiting advantages. For example, the method as described herein prevents overheating of the bearings or other vehicle components due to insufficient coolant or lubricant in the system. The method provides for an alert or diagnostic code regarding a fluid level in the system without the use of a fluid level sensor. The alert or diagnostic code as set by the controller may further cause the controller to provide additional operating limitations for the vehicle and the component to prevent the temperature of the component from further increasing. Furthermore, the method as described by the present disclosure provides an indication of fluid level without errors introduced by slosh on an uneven ground surface when using a conventional fluid level sensor such as a float sensor.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
an electric machine positioned within a housing having a sump;
a component temperature sensor connected to the electric machine to measure a temperature of the electric machine;
a fluid system in fluid communication with the housing and containing a lubricant, the fluid system receiving fluid from the sump and delivering fluid to the electric machine, the fluid system having a fluid temperature sensor to measure a temperature of the lubricant; and
a controller in communication with the component temperature sensor and the fluid temperature sensor, the controller configured to, in response to a temperature difference between the component temperature sensor and the fluid temperature sensor being greater than a predetermined threshold value, output a diagnostic code indicative of the lubricant in the fluid system being less than a predetermined fluid level.

2. The vehicle of claim 1 wherein the controller is further configured to select the predetermined threshold value from a set of predetermined threshold values.

3. The vehicle of claim 2 wherein the set of predetermined threshold values is dependent on vehicle driving conditions.

4. The vehicle of claim 2 further comprising a torque sensor associated with the electric machine; and
a vehicle speed sensor;
wherein the controller is in communication with the torque sensor and the vehicle speed sensor and is configured to input a first value indicative of an electric machine torque and a second value indicative of a vehicle speed to select the predetermined threshold value from the set of predetermined threshold values.

5. The vehicle of claim 4 wherein the controller is further configured to calculate the first value as a rolling average of the electric machine torque, and calculate the second value as a rolling average of the vehicle speed.

6. The vehicle of claim 4 wherein the controller is further configured to input the first value and the second value into at least one look-up table containing the set of predetermined threshold values.

7. The vehicle of claim 1 wherein the fluid temperature sensor is positioned in the sump of the housing.

8. The vehicle of claim 1 further comprising a transmission gearset, the transmission gearset positioned within the housing.

9. The vehicle of claim 1 wherein the fluid system is without a fluid level sensor.

10. A vehicle system comprising:
a vehicle component with a component temperature sensor;
a fluid circuit in fluid communication with the component, and with a fluid temperature sensor; and
a controller in communication with the component sensor and the fluid sensor and configured to, in response to a temperature difference between the component sensor and the fluid sensor being greater than a predetermined threshold value, output a flag indicative of a fluid level in the fluid circuit.

11. The vehicle system of claim 10 wherein the controller is further configured to select the predetermined threshold value from a set of predetermined threshold values, the set of predetermined threshold values dependent on vehicle driving conditions.

12. The vehicle system of claim 11 wherein the controller is further configured to receive at least one signal indicative of a vehicle state to determine the vehicle driving condition.

13. The vehicle system of claim 10 wherein the fluid circuit contains one of a coolant and a lubricant;
wherein the fluid circuit is without a fluid level sensor; and
wherein the flag is indicative of the fluid level in the fluid circuit being less than a predetermined fluid level.

14. The vehicle system of claim 13 wherein the vehicle component contains a first member rotating relative to a second member.

15. A diagnostic method for a vehicle fluid system, the method comprising:
receiving a signal indicative of a vehicle component temperature;
receiving a signal indicative of a fluid system temperature from a fluid system in fluid communication with a vehicle component; and
outputting a diagnostic code indicative of a fluid level in response to a temperature difference between the vehicle component temperature and the fluid system temperature being greater than a predetermined threshold value.

16. The method of claim 15 further comprising selecting the predetermined threshold value from a set of predetermined threshold values, the set of predetermined threshold values dependent on a vehicle drive cycle.

17. The method of claim 15 further comprising:
receiving at least one signal indicative of a vehicle state; and
selecting the predetermined threshold value from a set of predetermined threshold values, the set of predetermined threshold values dependent on the vehicle state.

18. The method of claim 17 wherein the vehicle state is at least one of a torque value and a speed value.

19. The method of claim 18 further comprising calculating the vehicle state using a rolling average of data from the at least one signal.

20. The method of claim 19 further comprising inputting the vehicle state into a lookup table to select the predetermined threshold value, the lookup table compiled using temperature difference data compiled from prior vehicle drive cycles and dependent on the vehicle state, with each predetermined threshold value set using the temperature difference data from the associated vehicle drive cycle and at least one of an average deviation and standard deviation for temperature difference data for the associated vehicle drive cycle.

* * * * *